July 27, 1954   S. E. WALDORF ET AL   2,684,785
TWIN FEED FERTILIZER SPREADER
Filed Dec. 17, 1951   3 Sheets-Sheet 1
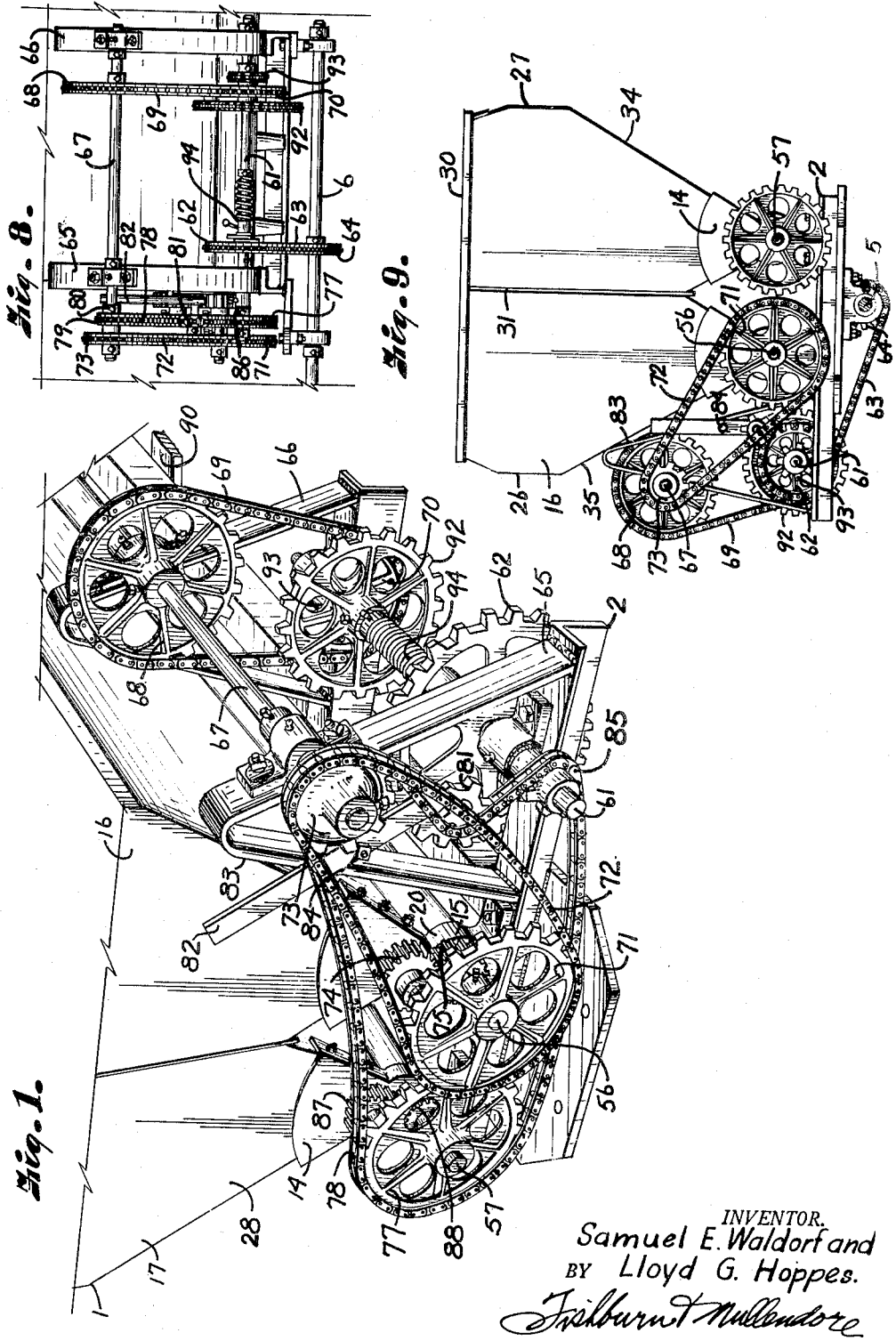
INVENTOR.
Samuel E. Waldorf and
BY Lloyd G. Hoppes.
Fishburn & Mullendore
ATTORNEYS.

July 27, 1954  S. E. WALDORF ET AL  2,684,785
TWIN FEED FERTILIZER SPREADER
Filed Dec. 17, 1951  3 Sheets-Sheet 2
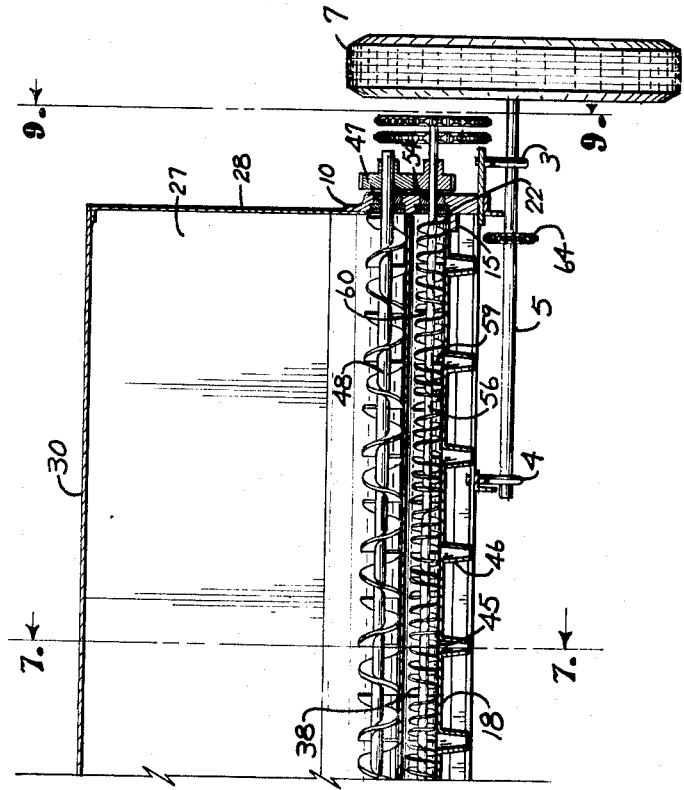
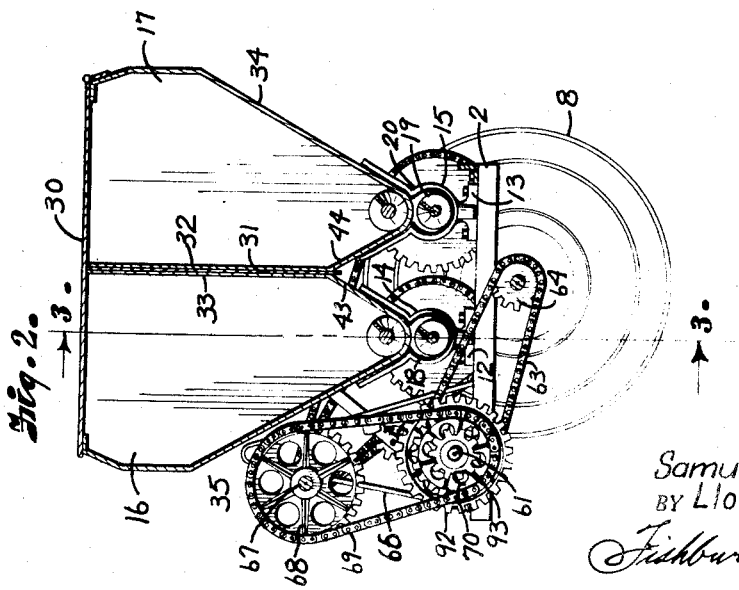
INVENTOR.
Samuel E. Waldorf and
BY Lloyd G. Hoppes.
ATTORNEYS.

July 27, 1954  S. E. WALDORF ET AL  2,684,785
TWIN FEED FERTILIZER SPREADER
Filed Dec. 17, 1951  3 Sheets-Sheet 3
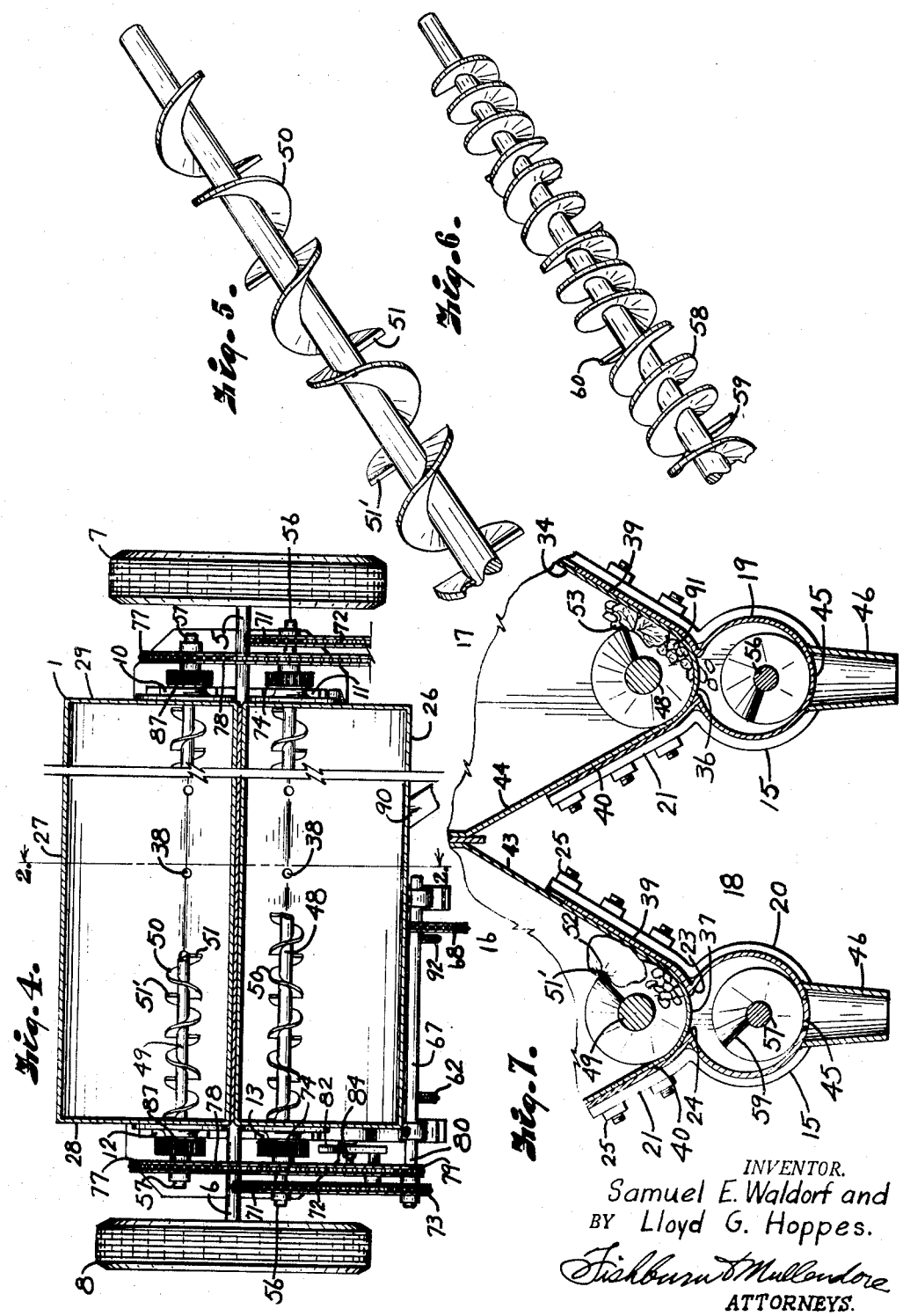
INVENTOR.
Samuel E. Waldorf and
BY Lloyd G. Hoppes.
Fishburn & Mullendore
ATTORNEYS.

Patented July 27, 1954

2,684,785

UNITED STATES PATENT OFFICE 2,684,785

TWIN FEED FERTILIZER SPREADER

Samuel E. Waldorf, Wichita, and Lloyd G. Hoppes, Hazelton, Kans., assignors, by mesne assignments, to Lester Wilkinson, Wichita, Kans., as trustee Application December 17, 1951, Serial No. 262,032

3 Claims. (Cl. 222—134)

1

This invention relates to new and useful improvements in apparatus for spreading commercial fertilizer or the like.

The principal object of the present invention is to provide a fertilizer spreader having twin hoppers for containing a different character of fertilizer in each thereof and having mechanism for dispensing the fertilizer from each hopper simultaneously or selectively and in varying amounts, one relative to the other.

Other objects of the present invention are to provide a wheel borne frame with twin hoppers thereon, the outside of the hoppers having downwardly and inwardly facing sides and the center of the hoppers being provided by straight partitions part way to the bottom thereof, but both hoppers terminating in a curved bottom having spaced openings longitudinally thereof and having shafts mounted longitudinally of the hoppers provided with a plurality of oppositely threaded spiral augers having the ends of some of the flights terminating over the spaced openings and other ends of the flights terminating intermediate thereof whereby the terminating edges of said flights will contact any lumps appearing in the fertilizer and crush the same against the tapered walls of the hoppers; to provide the shaft in the hoppers with oppositely threaded flights arranged relatively to the openings whereby rotation of the shaft effects feed of fertilizer toward the respective openings from each side thereof; to provide longitudinal cylindrical housings below said hoppers having shafts rotatably mounted therein provided with oppositely threaded spiral augers with the ends of some of the flights terminating over the openings in the bottom of said housing and the other ends of said flights terminating substantially under the openings in the hoppers for moving the fertilizer in opposite directions from said hopper openings, said flights metering and forcing the fertilizer in regulating amounts through the openings in the housing; to provide driving connection of said shafts with the axle shafts of the wheels of said apparatus; to provide for independent regulation of speed of rotation of said shafts in said hoppers and housings to regulate the feed of fertilizer from said housing; to provide means for operating the mechanism in one of the hoppers and housing without operating the mechanism in the other hopper and housing; to provide such mechanism with means for rotating said augers in the hoppers and housings in the opposite direction; and to provide a device of this character especially adapted for

2 spreading of fertilizer commercially over large areas.

In accomplishing these and other objects of the present invention, we have provided improved details of structure, the preferred form of which is illustrated in the accompanying drawings, wherein:

Fig. 1 is a fragmentary perspective view of the driving mechanism of our invention.

Fig. 2 is a cross sectional view taken on a line 2—2, Fig. 4, illustrating the driving mechanism of the device.

Fig. 3 is a fragmentary sectional view taken on a line 3—3, Fig. 2, particularly illustrating the auger in one of the hoppers and the auger in one of the housings.

Fig. 4 is a top plan, fragmentary view of our invention, particularly illustrating the augers in the hoppers with adjacent sections of the flights thereof threaded in opposite directions on the shaft.

Fig. 5 is a fragmentary elevational view of the top auger.

Fig. 6 is a fragmentary elevational view of the lower auger.

Fig. 7 is an enlarged cross sectional view taken on a line 7—7, Fig. 3, particularly illustrating the end of the flights on the top augers engaging a lump of fertilizer and crushing it.

Fig. 8 is a fragmentary front elevational view, particularly illustrating the selective driving mechanism.

Fig. 9 is a cross sectional view taken on a line 9—9, Fig. 3, also illustrating the driving mechanism for operating a single hopper.

Referring more in detail to the drawings:

1 designates a fertilizer spreader embodying the features of our invention having a frame 2 upon which is mounted suitable bearings 3 and 4 for axles 5 and 6 for mounting of wheels 7 and 8 for supporting the fertilizer spreader. Mounted on the ends 9 of the frame by suitable means are pairs of spaced brackets 10—11 and 12—13. The brackets are identical in structure and are provided at their upper ends with flanges 14 and inwardly directed flanges 15 (Fig. 1) for supporting hoppers 16 and 17 and housings 18 and 19 as presently described.

The inwardly directed flanges 15 on the brackets are cylindrical in shape as indicated at 20 (Fig. 1) and have upwardly and outwardly extending portions 21 to which the housings 18 and 19 and hoppers 16 and 17 are secured. The housings 18 and 19 are substantially cylindrical in shape and their ends engage in the cylindrical flanges 15 of the brackets, as indicated at 22 (Fig. 3). The upper portions of the walls of the cylindrical housings are spaced apart as indicated at 23 (Fig. 6) and the walls turn sharply upwardly and outwardly forming shoulders 24 at the respective upper sides of the housing.

The hoppers 16 and 17 are connected with the upwardly directed flanges of the brackets by bolts or the like 25. The hoppers comprise outer side walls 26 and 27 and ends 28 and 29. A top 30 is provided for the hoppers and hingedly connects thereto as is the usual practice. A partition 31 divides the two hoppers and extends downwardly forming inner side walls 32 and 33 providing inner walls for the respective hoppers. The outer sides 26 and 27 of the hoppers are tapered downwardly as indicated at 34 and 35 (Figs. 2 and 9), terminating in curved bottoms 36 and 37 which extend upwardly forming the walls 32 and 33 of the partition 31. The curved bottoms 36 and 37 are provided with a plurality of spaced openings 38 longitudinally of said bottoms and opening into the housings 18 and 19. Formed integrally with the housings 18 and 19 above the shoulders 20 are extensions 39 and 40 forming side portions extending alongside the lower portions of the tapered outer sides 34 and 35 and tapered inner sides 43 and 44 of the respective hoppers to strengthen said portions of the hoppers.

The housings 18 and 19 are provided in their bottoms with a plurality of openings 45 longitudinally of said housings and in staggered relation with the openings 38 in the hoppers for a purpose later described. Circling the openings 45 and mounted on the walls of the housings by welding or other suitable means are short spouts 46 adapted to receive flexible chutes or the like (not shown) for depositing the fertilizer in the soil.

The brackets 10—12 and 11—13 are provided with suitable bearings as indicated at 47 and 47' (Fig. 3) and mounted therein are shafts 48 and 49 extending longitudinally of the bottom of the hoppers but spaced therefrom as best illustrated in Fig. 7. Mounted on the shafts 48 and 49 is a plurality of auger screw sections 50, and as the auger sections on each shaft are identical only one will be referred to.

Each auger section has its flights or spirals terminating in substantially straight edges 51 and the flights are oppositely threaded so that said straight edges 51 of a pair of flights will terminate over the respective openings 38 in the bottom of said hoppers for feeding of the fertilizer material in the hoppers from both sides to said openings. The respective auger sections are so situated on the shafts 48 and 49 that the straight edges 51 will alternate in reaching the openings 38 so that a continuous feed will be provided to said openings. The respective auger sections are of a length to also terminate midway between the openings 38 so that should there be any lumps in the fertilizer material, the straight edges 51' will contact such lump as indicated at 52, (Fig. 7) and crush the same against the tapered walls 34 and 43 of the hoppers as best illustrated in Fig. 7. The augers crush the material as best illustrated at 53 so that the crushed material is then picked up by the adjacent augers and delivered to the next opening where it is fed to the cylindrical housings 18 and 19. The peripheral edges of the flights also aid in the crushing and grinding of the lumps.

Suitable bearings 54 and 55 are provided in the lower portions of the brackets 10—11 and 12—13 for mounting of shafts 56 and 57 longitudinally of the housings 18 and 19 and mounted on said shafts is a plurality of auger screw sections 58 terminating in straight edges 59 and 60 (Fig. 5) as in the upper auger section arrangement, the terminating straight edge 59 extends substantially midway of the openings 45 in the housings and the augers are oppositely faced so that the material in the housings is fed from both directions to the openings, the terminating points being alternated so that a continuous flow of the material is provided to the openings upon rotation of the shafts.

It will be noted that in the auger arrangement in the hoppers the flights of the augers 50 are a substantial distance apart to receive the material and provide for terminating points 51' for crushing and grinding the material in the hoppers, whereas in the cylindrical housing the flights of the augers are closer together and they extend substantially three complete revolutions of the shafts, but the outer ends of each oppositely threaded section terminates over an opening in the bottom of the housing the same as in the upper auger section arrangement. The upper and lower auger sections are such that the upper augers move more fertilizer in one revolution than the lower augers, and thereby provides agitation in the hopper. The lower augers meter the fertilizer delivered.

The frame 2 of the device extends forwardly of the hopper as illustrated in Fig. 1 and mounted on the forward portion of the frame of the respective ends thereof are jack shafts 61 upon which sprockets 62 are mounted over which chains 63 run to driving sprockets 64 on the axles 5 and 6. As the identical driving mechanism is provided at each end of the device, only one will be described.

Spaced brackets 65 and 66 are mounted on the lower portion of the frame 2 and extend upwardly for mounting of a short shaft 67 provided with a sprocket 68 accommodating a chain 69 leading to a sprocket 70 on the jack shaft 61. The shaft 56 extending through the housing 18 extends outwardly from the respective ends of the brackets 11 and 13, and mounted upon the outer end thereof is a sprocket 71 accommodating a chain 72 leading to a sprocket wheel or gear 73 mounted upon the short shaft 67. The ends of the shaft 48 in the hopper 16 also extend outwardly from the brackets 11 and 13 and mounted on the respective shafts 48 and 56 are spur gears 74 and 75 meshing with each other.

The shaft 57 extending through the housing 19 extends outwardly from the respective ends of the brackets 10 and 12, but are of a shorter length than the shaft 56 extending through the housing 18 as illustrated in Fig. 4, and mounted upon the outer ends thereof is a sprocket 77 accommodating a chain 78 leading to a sprocket wheel or gear 79 mounted upon the short shaft 67 adjacent the gear 73. The gear 79 may be loosely mounted on the shaft 67 or tightened thereon by a set screw 80 for a purpose later described. The chain 78 also runs over a tightening gear or sprocket 81 mounted on the lower end of a lever 82 pivotally mounted upon the rear leg 83 of the bracket 65 as indicated at 84 (Fig. 1). The chain 78 also engages a sprocket 85 which is loosely mounted on the outer end of shaft 61 or may be tightened on said shaft by set screw 86 also for a purpose later described. The ends of the shaft 49 in the hopper 17 also extend outwardly from the brackets 10 and 12 and mounted on the respective shafts 49 and 57 are spur gears 87 and 88 meshing with each other.

The framework structure includes forwardly extending brace members 90 and mounted on the forward ends thereof is a suitable connection (not shown) for a tractor or the like (also not shown) for propelling the device over the ground.

Operation of the fertilizer spreader constructed and assembled as described is as follows.

The desired quantity of fertilizer material 91 is placed in the hoppers 16 and 17 and movement of the device over the ground will cause the drive mechanism on the axle shafts to rotate the sprockets 64 and through chain connection 63 with the larger sprocket 62 on the jack shaft 61 having connection with the larger sprocket 68 through chain 69 and sprocket 70 will rotate the short shaft 67, and the chain connection 72 with the smaller sprocket 73 on the short shaft will cause the larger sprocket 71 on the shaft 56 to rotate and cause the spur gear 75 to mesh with spur gear 74 to rotate such gear on the shaft 48.

It will be noted that the auger in the housing 18 will be operated in an anticlockwise direction, whereas the auger in the hopper 16 will operate in a clockwise direction (Fig. 2).

The operation thus far described dispenses the fertilizer from the forward hopper 16 of the device. To dispense material from both hoppers simultaneously, operation of the drive mechanism as above described will cause the shaft 61 through its driving gear 62 to rotate turning sprocket 85 on the outer end thereof, which is tightened thereon, and through chain connection 78 with sprocket 79 on the short shaft 67 through connection with sprockets 77 on the shaft 57 extending through the housing 19 to rotate and cause the spur gear 88 to mesh with spur gear 87 to rotate said gear on the shaft 57.

It will be noted that the auger in the housing 19 will be operated in an anticlockwise direction, whereas the auger in the hopper 17 will operate in a clockwise direction, the same as in the forward housing. It will also be noted that when sprocket 85 is tightened on shaft 61 the sprocket 79 on short shaft 67 will be loosely mounted thereon and vice versa depending upon the rate desired for rotation of the sprocket 78 and feed of material from the hopper 17.

Rotation of the augers in the hoppers will feed the material through the openings 38 to the housings 18 and 19 and, as above stated, the ends of the flights terminate over such openings, and the straight edges 51 and 51' of the auger sections will crush the material against the side of the hoppers so that it will be fed through the openings 38. The openings 45 in the housings are in staggered relation to the openings 38 in the hoppers. The auger sections in the housings will pick the material up and take it in both directions until it reaches the openings 45 in the housings to feed it through the spouts 46 and flexible chutes to the soil as desired.

The straight edges of the flights of the augers in the housings extend midway over such openings, and the ends of facing flights alternate in reaching such openings so that the continued feed of the material will be supplied to such openings. The housings are kept substantially full of material and rotation of the augers therein will cause the material to be ground against the shoulders 24 at the upper edges of the housings to further pulverize the material therein so that it will be fed through the openings.

The gear arrangement is such that the augers in the hoppers 16 and 17 rotate at a slower rate than the augers in the housings 18 and 19. The openings 38 in the hoppers are substantially smaller than the openings in the housings, the flights being spaced farther apart in the hoppers, thus having a longer lead and the material will be fed to the housing at a faster rate of speed so as to keep the housings substantially full at all times. Should one of the openings in the hoppers become clogged, there will be enough material fed through the other openings to maintain sufficient fertilizer in the housings, so that a continuous flow of the material will be provided through the openings in the housings.

The jack shaft 61 is provided with different sized sprockets as indicated at 92 and 93, so that the chain 69 may be run to such sprockets to regulate the speed of the augers to regulate the amount of fertilizer material to be fed to the soil from the hoppers.

The rate of flow of fertilizer from the hopper 17 may be further regulated by use of either the sprockets 85 or 79. When the sprocket 85 is tightened on shaft 61 and the sprocket 79 is loosened on shaft 67, rate of flow of fertilizer from the hopper 17 will be greater because the sprocket 85 is directly driven from sprocket 62. By loosening of the sprocket 85 and tightening of the sprocket 79, a slower rate of flow of fertilizer will be fed to the soil, because the difference in rate of rotation of shafts 61 and 67. Thus it will be obvious that different kinds of fertilizer may be used in the respective hoppers 16 and 17 and the rate of flow of such fertilizer from the respective hoppers simultaneously may be effected.

It will be noted by reference to Fig. 1 that fertilizer may be dispensed from the forward hopper only. This can be accomplished by operation of lever 82 to disengage sprocket 81 from chain 78, and removal of such chain from the sprockets 79, 77 and 85 respectively.

The jack shaft is also provided with clutch mechanism as indicated at 94 (Fig. 8) for throwing the feed mechanism out of gear when the device is not in use and for transportation.

What we claim and desire to secure by Letters Patent is:

1. A fertilizer distributing apparatus comprising, a pair of hoppers in side by side relation having downwardly tapered sides terminating in downwardly curved bottoms, said bottoms having a plurality of longitudinally spaced openings, substantially cylindrical shaped housings extending longitudinally under the bottoms of said hoppers and in communication therewith through the openings in the bottoms of said hoppers, said housings having a plurality of longitudinally spaced openings in the bottoms thereof in staggered relation to the openings in the bottoms of the hoppers, shafts rotatably mounted in the hoppers, a plurality of oppositely threaded auger screw sections mounted on said shafts, the ends of each auger screw section terminating in substantially straight edges and one end of each section terminating over the openings in said hoppers and in staggered relation with each other, the opposite ends of said sections terminating substantially midway between said openings, the substantially straight edges of said sections being so arranged as to contact and crush lumps of material against the sides of said hoppers, shafts rotatably mounted in said housings below said hoppers, a plurality of oppositely threaded auger screw sections mounted on the shafts in said housings, the ends of each auger screw section terminating over the openings in said housings and in staggered relation with each other, and means for rotating the upper and lower auger sections in one hopper and housing independently of the other hopper and housing to thereby control the relative rates at which fertilizer is discharged from said hoppers and housings.

2. A fertilizer distributing apparatus comprising, a pair of hoppers in side by side relation having downwardly tapered sides terminating in downwardly curved bottoms, said bottoms having a plurality of longitudinally spaced openings, substantially cylindrical shaped housings extending longitudinally under the bottoms of said hoppers and in communication therewith through the openings in the bottoms of said hoppers, said housings having a plurality of longitudinally spaced openings in the bottoms thereof in staggered relation to the openings in the bottoms of said hoppers, shafts rotatably mounted in the hoppers, a plurality of oppositely threaded auger screw sections mounted on said shafts, the ends of each auger screw section terminating in substantially straight edges and one end of each section terminating over the openings in said hoppers and in staggered relation with each other, the opposite ends of said sections terminating substantially midway between said openings, the substantially straight edges of said sections being so arranged as to contact and crush lumps of material against the sides of said hoppers, shafts rotatably mounted in said housings below said hoppers, a plurality of oppositely threaded auger screw sections mounted on the shafts in said housings, the ends of each auger screw section terminating over the openings in said housings and in staggered relation with each other, and means for rotating the auger sections of one hopper and housing at a different rate of speed from the auger sections in the other hopper and housing to regulate the rate of feed of fertilizer from the respective hoppers and housings.

3. A fertilizer distributing apparatus comprising, hoppers extending parallel to each other having downwardly tapered sides terminating in downwardly curved bottoms, said bottoms having a plurality of longitudinally spaced openings, substantially cylindrical shaped housings extending longitudinally under the bottoms of said hoppers, said housings having their free ends turned upwardly at angles and a longitudinal opening extending over the openings in bottom of said hoppers, said housings having a plurality of longitudinally spaced openings in the bottoms thereof in staggered relation to the openings in the bottoms of said hoppers, shafts rotatably mounted in the hoppers, a plurality of oppositely threaded auger screw sections mounted on said shafts, the ends of each auger screw section terminating in substantially straight edges and one end of each section terminating over the openings in said hoppers and in staggered relation with each other, the opposite ends of said sections terminating substantially midway between said openings, the substantially straight edges of said sections being so arranged as to contact and crush lumps of material against the sides of said hoppers, shafts rotatably mounted in said housings below said hoppers, a plurality of oppositely threaded auger screw sections mounted on the shafts in said housings, the ends of each auger screw section terminating over the openings in said housings and in staggered relation with each other, said auger screw sections being of a diameter in transverse cross section corresponding substantially to the inner diameter of said housings means for rotating the upper and lower auger sections in each hopper and housing, the lower auger screws rotating at a slightly greater speed than the upper auger screws and the upper screws having longer leads to move the fertilizer faster than the lower augers to keep the housings substantially full, and means for rotating said shafts in each hopper and housing at different speed than the shafts in the other hopper and housing.

References Cited in the file of this patent

UNITED STATES PATENTS

| Number | Name | Date |
|---|---|---|
| 905,395 | West | Dec. 1, 1908 |
| 2,193,373 | Munro | Mar. 12, 1940 |
| 2,522,693 | Stiteler | Sept. 19, 1950 |
| 2,594,687 | Scott | Apr. 29, 1952 |
| 2,596,898 | Hoppes | May 13, 1952 |